United States Patent Office 3,066,134
Patented Nov. 27, 1962

3,066,134
DISAZO-PYRAZOLONE DYESTUFFS
Rene Eugene Marcel Gangneux, Rouen, and Jacques Jules Jean Le Blanc, Oissel, France, assignors to Compagnie Francaise des Matieres Colorantes, Paris, France, a company of France
No Drawing. Filed Oct. 22, 1959, Ser. No. 847,916
Claims priority, application France Oct. 27, 1958
2 Claims. (Cl. 260—160)

The present invention concerns new dyestuffs, their preparation and their use in the colouration of polyester fibres. By the expression "polyester fibres" we mean quite generally the fibres obtained by the polycondensation of diacids with dialcohols and in particular those obtained by the polycondensation of terephthalic acid with ethylene glycol. Such fibres are found on the market under the names "Terylene," Dacron" and "Tergal," for example.

It is known that it is possible to dye or print polyester fibres by means of the so-called plastosoluble dyestuffs used for dyeing or printing fibres based on cellulose acetate. These dyestuffs can be applied either at ordinary pressure in the presence of carriers, the commonest of which are orthophenylphenol and the chlorinated derivatives of benzene, or under pressure and in the absence of carriers and in a short time. The shades obtained are generally fairly bright; in many cases, however, their fastness is not sufficient, especially to light, to wet tests and to sublimation.

In addition it is known that it is possible to dye polyester fibres under the conditions used for the plastosoluble dyestuffs by means of mixtures of diazotizable bases and coupling compounds belonging to the series of arylides of β-hydroxynaphthoic acid. The corresponding pigments are formed on the fibre by simultaneous diazotization and coupling. Provided that the choice of the base and the arylide are correct, as well as the ratio between the quantities of these substances fixed on the fibre, the colourations obtained are fast to light and to the wet tests. Although from the absolute point of view the resistance to sublimation is satisfactory, nevertheless variations in shade which may be considerable, are observed in many cases at the time of preforming. In addition, this dyeing process has the disadvantage of being lengthy since two successive treatments of the fibre are necessary.

Further, the use of finely dispersed pigments has been recommended which pigments are obtained by coupling the diazo derivatives of diazotizable bases free from solubilising groups, such as hydroxyl or carboxyl groups, with coupling compounds such as the pyrazolones or the arylides of acetylacetic acid or of aromatic o-hydroxycarboxylic acids of which the nuclei can be monocyclic, polycyclic or heterocyclic. These pigments cannot in general be use din dyeing at ordinary pressure, even in the presence of carriers. They possess a certain number of advantages as compared with plastosoluble dyestuffs, however; they enable colourations of greater brightness and better resistance to wet tests and above all to sublimation to be obtained. Nevertheless, certain shades are only available by using mixtures of these dispersed pigments. The elementary shades being far removed from one another, the shade of the mixture is insufficiently bright. Moreover the shades obtained by mixing are difficult to reproduce.

We have now found that this disadvantage and this difficulty can be avoided by colouring polyester fibres with the novel dyestuffs of the general formula:

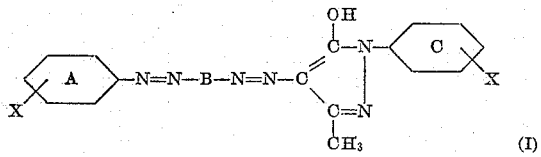

in which B represents the residue of a benzene or naphthalene amine possibly substituted by alkyl, alkoxy or hydroxyalkoxy groups and coupling in the para position to the amino group, the benzene rings A and C may be substituted by halogen atoms or alkyl, alkoxy, hydroxyalkoxy or nitro groups, one at least of the substituents X and Y represents a simple or substituted sulphonamido or carbonamido group; the substituents on the sulphonamido or carbonamido groups may be alkyl, hydroxyalkyl or aryl residues possibly substituted but without carboxyl or sulpho groups. When only one of the substituents X and Y represents a simple or substituted sulphonamido or carbonamido group the other substituent represents a hydrogen atom.

The dyestuffs of general Formula I may be prepared by coupling, in alkaline medium, the diazo compound of an amine of the formula:

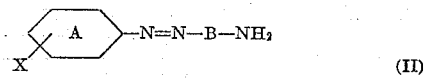

with a pyrazolone derivative of the formula:

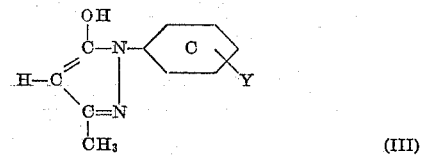

in which formulae the significance of B, X and Y and the possible substituents of the benzene rings A and C are the same as above.

In spite of their relatively high molecular weight, the dyestuffs of the general Formula I possess a remarkable affinity for polyester fibres. They can be applied by dyeing or printing and give shades ranging from reddish yellow to bordeaux. These shades possess good fastness to light and to the most severe wet tests and an exceptional resistance to sublimation.

The invention will be more clearly understood by reference to the following examples, in which the parts given are parts by weight unless the contrary is indicated, and which are purely illustrative.

EXAMPLE 1

197 parts of 4-aminoazobenzene, previously made into a paste in 5000 parts of water and 250 parts by volume of 19° Bé. hydrochloric acid, are diazotized by means of 138 parts by volume of a 50% by weight solution of sodium nitrite. The solution of the diazo compound thus obtained is introduced into a solution of 253 parts of 1-(3'-sulphonamido-phenyl)-3-methyl-5-pyrazolone in 3000 parts of water and 120 parts by volume of 35° Bé. caustic soda, to which solution 200 parts of crystalline sodium acetate and 50 parts of sodium bicarbonate are also added before coupling.

The dyestuff thus formed is isolated by filtration; the paste obtained is dispersed by means of sodium methylene-dinaphthylsulphonate at the rate of 2 parts of dispersing agent to one part of dyestuff in the form of the dry paste.

EXAMPLE 2

A dyebath is prepared, in an apparatus allowing operation under pressure, by making one part of the dispersed dyestuff of Example 1 into a paste in 2000 parts of water. Into this bath are introduced 100 parts of polyester fibres previously degreased by hot treatment in alkaline medium. The temperature is taken to 130° C. over an hour and kept at this for one hour. After the return to ordinary pressure, the fibre is subjected to an alkaline reducing treatment in a bath containing 1 g. per litre of a derivative of ethylene oxide and octylphenol such as that which results from the addition of 9.5 molecules of the former to one of the latter.

The polyester fibres are dyed a yellow-orange shade of exceptional brightness, of excellent fastness to light and to wet tests and of complete stability to sublimation.

The table below summaries a certain number of examples analogous to the preceding examples; the dyestuffs are defined by the bases and the coupling compounds from which they are prepared.

| Example | Diazotized base | Coupling Compound | Shade |
|---|---|---|---|
| 3 | 2'-chloro-3,6-dimethoxy-4-amino-azobenzene. | 1-(3'-sulphonamido-phenyl)-3-methyl-5-pyrazolone. | bluish red. |
| 4 | 3,2'-dimethoxy-4-amino-azobenzene. | ___do___ | orange. |
| 5 | 3,2'-dimethoxy-6,5'-dimethyl-4-amino-azobenzene. | ___do___ | red orange. |
| 6 | 4-(3'-nitro-phenyl-azo)-2-hydroxy-ethoxy-naphthyl-amine. | ___do___ | bordeaux. |
| 7 | 3'-sulphonamido-4-amino-azobenzene. | 1-phenyl-3-methyl-5-pyrazolone. | reddish yellow. |

EXAMPLE 8

A printing paste is prepared comprising the following elements:

|  | Parts |
|---|---|
| Dyestuff of Example 3 | 3 |
| Dyestuff of Example 6 | 3 |
| Sodium methylene-dinaphthylsulphonate | 14 |
| Monoethyl ether of glycol | 50 |
| Water | 300 |
| Aqueous solution of sodium chlorate (1 part of chlorate to 2 parts of water) | 30 |
| Thickener | 600 |

This paste is applied to fabric of polyester fibres on a frame or on a roller and steaming under pressure at 120–130° C. is then carried out for the purpose of fixing the dyestuff, and finally an alkaline reducing treatment is given in a bath containing 1 to 2 g. per litre of an octylphenol-ethylene oxide condensate. A very bright bordeaux shade is obtained.

We claim:

1. Dyestuffs of the general formula $$\text{A}-N=N-B-N=N-C\begin{matrix}\overset{OH}{\overset{|}{C}}-N-\phantom{x}\\ \phantom{xxx}\diagdown\\ C=N\\ |\\ CH_3\end{matrix}\diagup\text{—}SO_2NH_2$$

in which B represents a member selected from the group consisting of β-hydroxyethoxy 1,4-naphthylene, 1,4-phenylene, alkoxy 1,4-phenylene, alkyl alkoxy 1,4-phenylene groups, the said alkyl and alkoxy substituents having up to two carbon atoms, and the benzene nucleus A being substituted by a member selected from the group consisting of hydrogen and chlorine and the alkyl, alkoxy and nitro groups, the said alkyl and alkoxy substituents have up to two carbon atoms.

2. Dyestuff of the formula:

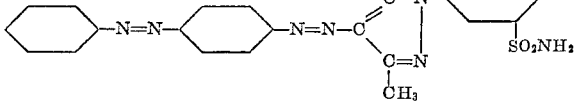

References Cited in the file of this patent

UNITED STATES PATENTS

| 2,216,446 | McNally et al. | Oct. 1, 1940 |
| 2,317,387 | Kralnes et al. | Apr. 27, 1943 |
| 2,432,393 | Dickey et al. | Dec. 9, 1947 |
| 2,869,969 | Schulze | Jan. 20, 1959 |
| 2,880,050 | Fortess et al. | Mar. 31, 1959 |

OTHER REFERENCES

Venkataraman: Synthetic Dyes, vol. II, page 1221.